United States Patent
Fujita et al.

(10) Patent No.: US 8,396,500 B2
(45) Date of Patent: Mar. 12, 2013

(54) CONNECTION DESTINATION BASE STATION DETERMINATION DEVICE

(75) Inventors: Hiroshi Fujita, Kawasaki (JP); Yoshiharu Tajima, Kawasaki (JP); Atsuya Tanaka, Annaka (JP)

(73) Assignee: Fujitsu Limted, Kawasaki (JP)

( * ) Notice: Subject to any disclaimer, the term of this patent is extended or adjusted under 35 U.S.C. 154(b) by 1116 days.

(21) Appl. No.: 10/569,875

(22) PCT Filed: Oct. 27, 2003

(86) PCT No.: PCT/JP03/13734
§ 371 (c)(1), (2), (4) Date: Aug. 25, 2006

(87) PCT Pub. No.: WO2005/041609
PCT Pub. Date: May 6, 2005

(65) Prior Publication Data
US 2009/0275353 A1    Nov. 5, 2009

(51) Int. Cl.
*H04B 7/00* (2006.01)
*H04B 7/15* (2006.01)
*H04B 7/185* (2006.01)
(52) U.S. Cl. ............... 455/513; 455/11.1; 455/13.1
(58) Field of Classification Search ........... 455/11.1, 455/13.1, 513
See application file for complete search history.

(56) References Cited

U.S. PATENT DOCUMENTS

| | | | | |
|---|---|---|---|---|
| 5,218,354 A | * | 6/1993 | Hess | 455/513 |
| 5,781,536 A | * | 7/1998 | Ahmadi et al. | 370/252 |
| 6,002,676 A | * | 12/1999 | Fleming | 370/328 |
| 6,201,971 B1 | * | 3/2001 | Purnadi et al. | 455/450 |
| 6,466,795 B1 | * | 10/2002 | Ahn | 455/450 |
| 6,564,068 B1 | | 5/2003 | Marsan | |
| 6,925,306 B2 | * | 8/2005 | Obata et al. | 455/453 |
| 2002/0073279 A1 | * | 6/2002 | Sasamoto et al. | 711/114 |
| 2002/0102981 A1 | * | 8/2002 | Jechoux | 455/450 |
| 2002/0177911 A1 | * | 11/2002 | Waugh et al. | 700/30 |
| 2003/0139186 A1 | | 7/2003 | Igarashi et al. | |

(Continued)

FOREIGN PATENT DOCUMENTS

GB  2 313 258   11/1997
JP  9-200841   7/1997

(Continued)

OTHER PUBLICATIONS

Supplementary European Search Report dated Feb. 15, 2008, from the corresponding European Application.

(Continued)

*Primary Examiner* — Bobbak Safaipour
(74) *Attorney, Agent, or Firm* — Fujitsu Patent Center

(57) ABSTRACT

A connection destination base station determination device is disclosed that includes: a storage part configured to store information indicating a radio base station that has transmitted a signal received with intensity at or above a certain level in a mobile terminal, and information indicating the amount of available resources in the radio base station; a selection part configured to select, of radio base stations having the amount of available resources greater than or equal to the amount of resources requested by the mobile terminal, a radio base station different from a radio base station having the largest amount of available resources as a connection destination radio base station; and a notification part configured to notify the selected radio base station that the mobile terminal is to be connected thereto.

8 Claims, 15 Drawing Sheets

U.S. PATENT DOCUMENTS

| | | | |
|---|---|---|---|
| 2003/0157941 A1* | 8/2003 | Obata et al. | 455/452 |
| 2003/0220109 A1* | 11/2003 | Jami et al. | 455/437 |
| 2007/0249363 A1* | 10/2007 | Amalfitano et al. | 455/453 |
| 2011/0117947 A1* | 5/2011 | Ishii et al. | 455/509 |

FOREIGN PATENT DOCUMENTS

| | | |
|---|---|---|
| JP | 2000-78653 | 3/2000 |
| WO | 95/31879 | 11/1995 |
| WO | 97/23110 | 6/1997 |
| WO | 99/51052 | 10/1999 |
| WO | 01/35586 | 5/2001 |
| WO | WO 02/25983 | 3/2002 |

OTHER PUBLICATIONS

International Search Report dated Jan. 20, 2004.

\* cited by examiner

CONNECTION DESTINATION BASE STATION DETERMINATION DEVICE

CROSS-REFERENCE TO RELATED APPLICATION

The present application is a U.S. national application of PCT International Application No. PCT/JP2003/013734, filed on Oct. 27, 2003, the entire contents of which are hereby incorporated by reference.

BACKGROUND OF THE INVENTION

1. Field of the Invention

The present invention generally belongs to the technical field of cellular mobile communications, and particularly relates to a connection destination base station determination device that determines an appropriate connection destination radio base station from among multiple radio base stations.

2. Description of the Related Art

A mobile terminal in a cellular communications system is capable of performing communications while moving in a geographic area covered by multiple cells. Allocation of communication resources or radio resources is managed cell by cell or sector by sector. When the mobile terminal moves beyond a cell or sector, a process called handover is performed, so that radio resources to be used in a move destination cell or sector are suitably determined.

In a cellular communications system, when handover is performed, a radio base station transmitting a control signal whose received signal strength indication (RSSI) is high in a mobile terminal is selected as a move destination or connection destination radio base station.

Further, in the communications system described in Japanese Laid-Open Patent Application No. 9-200841 (Patent Document 1), a radio base station whose RSSI is greater than a predetermined value and whose number of available channels is the largest is preferentially selected as a connection destination radio base station. This enables reduction in traffic concentration on a single radio base station and traffic decentralization. It is also possible to reduce a mobile terminal's wait period for a call connection by preferentially assigning a radio base station having a larger number of available channels to the mobile terminal.

Patent Document 1

Japanese Laid-Open Patent Application No. 9-200841

By the way, the contents of communications in conventional mobile communications have been audio-centered and relatively small in data amount. However, recent developments in mobile communications technology have made it possible to transmit large amounts of data such as images and video. Therefore, the amount of data communicated by a mobile terminal may vary from small to large. Accordingly, the communications resources requested by a mobile terminal differ significantly depending on the data volume and data rate. In particular, a mobile terminal that desires to transmit a large amount of data at high speed requires a large amount of communications resources.

Consideration is given of the case where a mobile terminal requesting high-speed data transmission makes a determination based only on RSSI in determining the move destination radio base station of the handover. In this case, the radio base station that provides the highest RSSI does not necessarily possess a sufficient amount of available resources for high-speed data transmission, and without it, a connection request is rejected. Then, similarly, the amount of resources requested by the mobile terminal and the amount of available resources are also compared with respect to the radio base station providing the next highest RSSI, and thereafter, it is determined whether to authorize connection in the same manner. Accordingly, according to this method, it is not less likely that a new connection request by a mobile terminal that desires high-speed data transmission will be rejected, thus causing a problem in that it takes a long time before an appropriate connection destination is found.

On the other hand, according to the invention described in Patent Document 1, resource allocation is performed so that the rate of use of radio resources is uniform among radio base stations. Accordingly, if the rate of use becomes relatively high-level, there may be a problem in that although the total amount of available resources of the radio base stations exceeds the amount of resources requested by a mobile terminal, none of the radio base stations satisfies the amount of resources requested by the mobile terminal, so that no connection can be made to any of the radio base stations. For example, it is assumed that a mobile terminal requires radio resources for four channels and that two radio base stations possess the amounts of available resources of three channels and of two channels, respectively, at the time of handover. In this case, the amount of available resources for three+two=five channels exists in the system as a whole, and yet neither radio base station can answer the request of the mobile terminal independently. Thus, according to the conventional method, there is concern for reduction in the usage efficiency of communications resources in a communications system required to satisfy requested resources varying in amount from small to large.

SUMMARY OF THE INVENTION

Accordingly, it is a general object of the present invention to provide a connection destination base station determination device in which at least one of the above-described disadvantages are eliminated.

A more specific object of the present invention is to provide a connection destination base station determination device capable of improving the rate of new connections and improving the rate of handover success of a mobile terminal in a cellular communications system.

Another more specific object of the present invention is to provide a connection destination base station determination device capable of improving the rate of new connections and improving the handover success rate of a mobile terminal requesting high-speed data transmission.

One or more of the above objects of the present invention are achieved by a connection destination base station determination device including: a storage part configured to store information indicating a radio base station having transmitted a signal received with intensity at or above a certain level in a mobile terminal, and information indicating an amount of available resources in the radio base station; a selection part configured to select, of radio base stations having the amount of available resources greater than or equal to an amount of resources requested by the mobile terminal, a radio base station different from a radio base station having a largest amount of available resources as a connection destination radio base station; and a notification part configured to notify the selected radio base station that the mobile terminal is to be connected thereto.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

Figure 1:
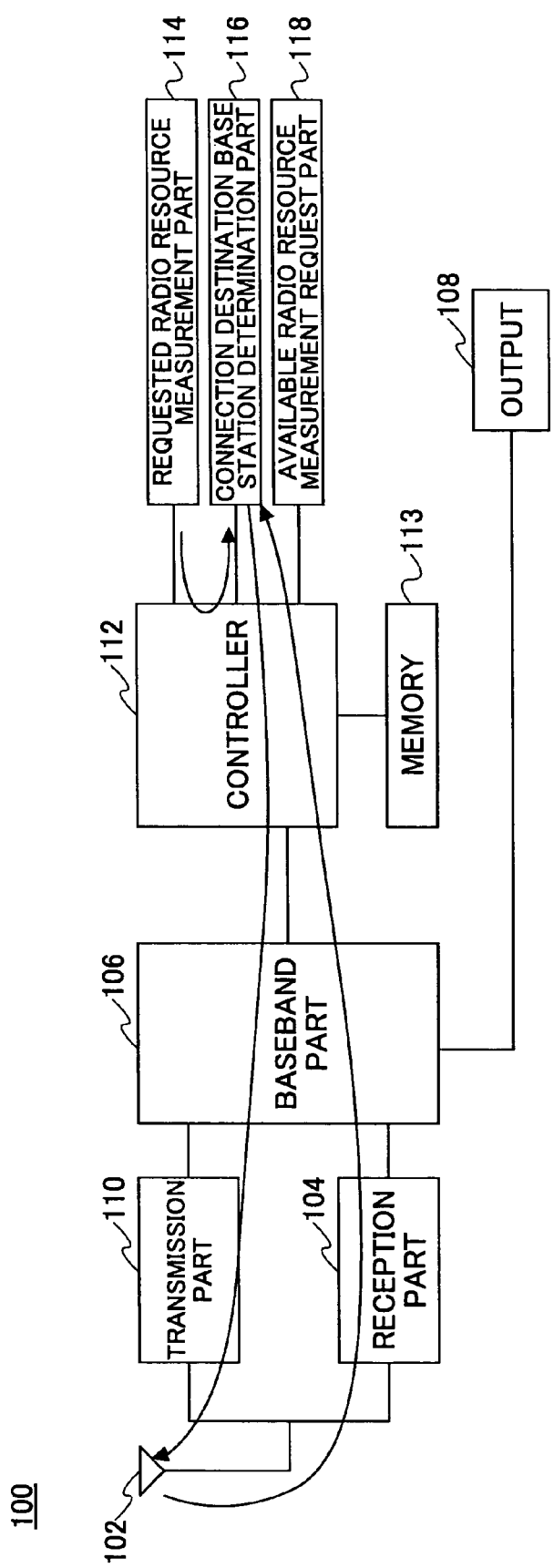
FIG. 1 is a functional block diagram related to principal functions of a mobile terminal according to an embodiment of the present invention.

FIG. 1 shows the functional blocks of elements particularly related to the present invention in a mobile terminal 100 according to the embodiment of the present invention. The mobile terminal 100 has an antenna part 102 for transmitting and receiving a radio signal to and from a radio base station. The mobile terminal 100 has a reception part 104 connected to the antenna part 102, and the reception part 104 performs processing related to the reception front end known in the corresponding technical field, such as frequency conversion, band limiting, amplification, analog-to-digital conversion, etc., on the radio signal. The mobile terminal 100 has a baseband part 106 connected to the output of the reception part 104. This principally performs digital signal processing related to a received signal so as to reconstruct user data such as audio and images, and provides them to a user in an output part 108. The output part 108 is, for example, a speaker for an audio signal and a display for an image signal. Further, the baseband part 106 also performs processing for constructing a transmission signal in a baseband. The mobile terminal 100 has a transmission part 110. The transmission part 110 is connected to the baseband part 106, and receives the transmission signal formed therein. In the transmission part 110, the transmission signal is further converted into an analog signal, and processing related to the transmission front end known in the corresponding technical field, such as frequency conversion, band limiting, amplification, etc., is performed. Thereafter, the transmission signal is transmitted by radio through the antenna part 102.

The mobile terminal 100 has a controller 112, and the controller 112 controls each processing element in the mobile terminal 100. The mobile terminal 100 has a requested radio resource measurement part 114, a connection destination base station determination part 116, and an available radio resource measurement request part 118, which are connected to the controller 112. The requested radio resource measurement part 114 measures how much amount of radio resources is necessary (the requested amount of resources) for the communications performed by the mobile terminal 100. The connection destination base station determination part 116 determines an appropriate connection destination radio base station based on the amounts of available resources of radio base stations and the requested amount of resources. The available radio resource measurement request part 118 requests information indicating how much amount of resources is available from the radio base stations. By receiving this information, the mobile terminal 100 can understand the amount of available resources of each radio base station. The amount of available resources is stored in, for example, a memory 113 connected to the controller 112. Other information items necessary for connection destination determination are stored in the memory 113. If the radio base stations periodically report information on the amount of available resources to a mobile terminal, the available radio resource measurement request part 118 is unnecessary.

Figure 2:
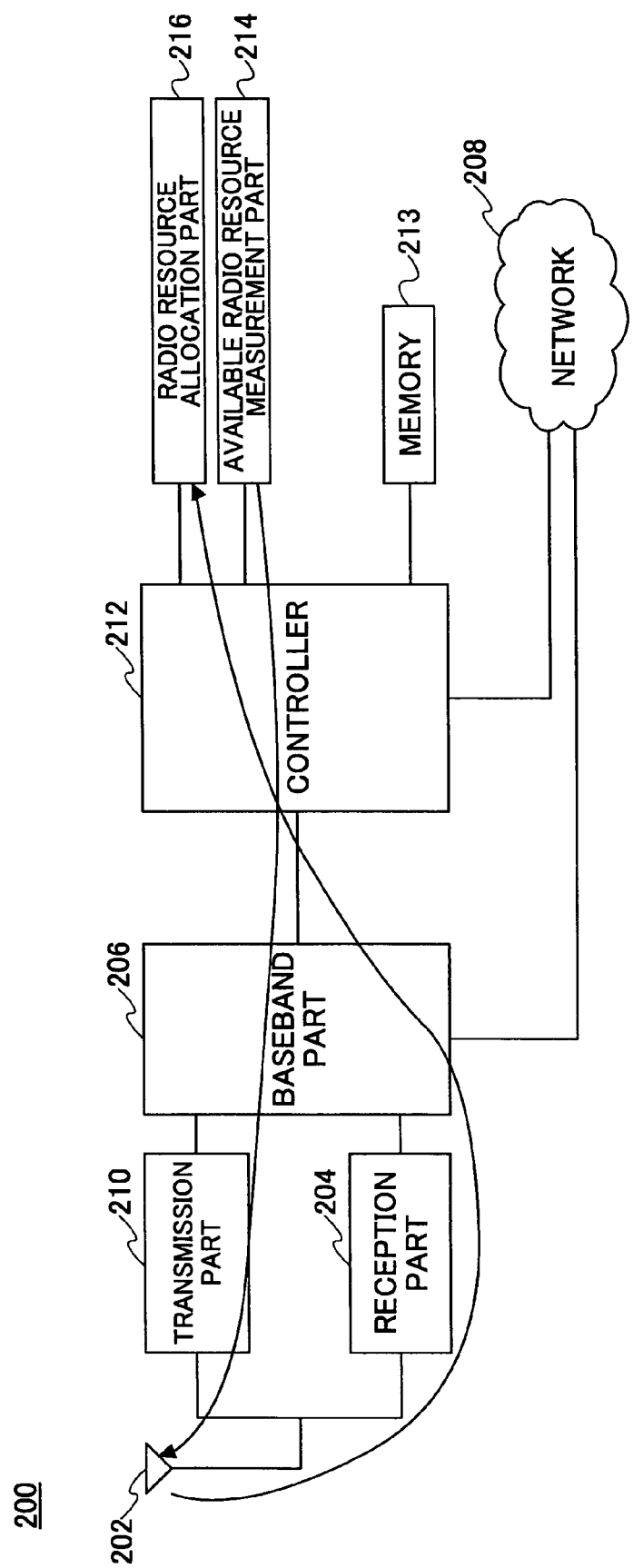
FIG. 2 is a functional block diagram related to principal functions of a radio base station according to the embodiment of the present invention.

FIG. 2 shows the functional blocks of elements particularly related to the present invention in a radio base station according to the embodiment of the present invention. A radio base station 200 has an antenna part 202 for transmitting and receiving a radio signal to and from the mobile terminal 100. The radio base station 200 has a reception part 204 connected to the antenna part 202, and the reception part 204 performs processing related to the reception front end known in the corresponding technical field. The radio base station 200 has a baseband part 206 connected to the output of the reception part 204. This principally performs digital signal processing related to a received signal so as to reconstruct user data such as audio and images, and transmits them to an upper level network 208. Further, the baseband part 206 also performs processing for constructing a transmission signal in baseband. A transmission signal is fed from the network 208 to the baseband part 206 via a controller 212. The radio base station 200 has a transmission part 210. The transmission part 210 is connected to the baseband part 206, and receives the transmission signal formed therein. In the transmission part 210, processing related to the transmission front end known in the corresponding technical field is performed. Thereafter, the transmission signal is transmitted by radio through the antenna part 202.

The radio base station 200 has the controller 212, and the controller 212 controls each processing element in the radio base station 200. The radio base station 200 has a radio resource measurement part 214 and a radio resource allocation part 216, which are connected to the controller 212. The radio resource measurement part 214 measures how much amount of available resources the radio base station 200 currently possesses. Information items such as the amount of available resources, etc., are stored in a memory 213 connected to the controller 212. The radio resource allocation part 216 allocates communications resources in accordance with an instruction from the mobile terminal 100, so that a radio link with the mobile terminal 100 is established.

Figure 3:
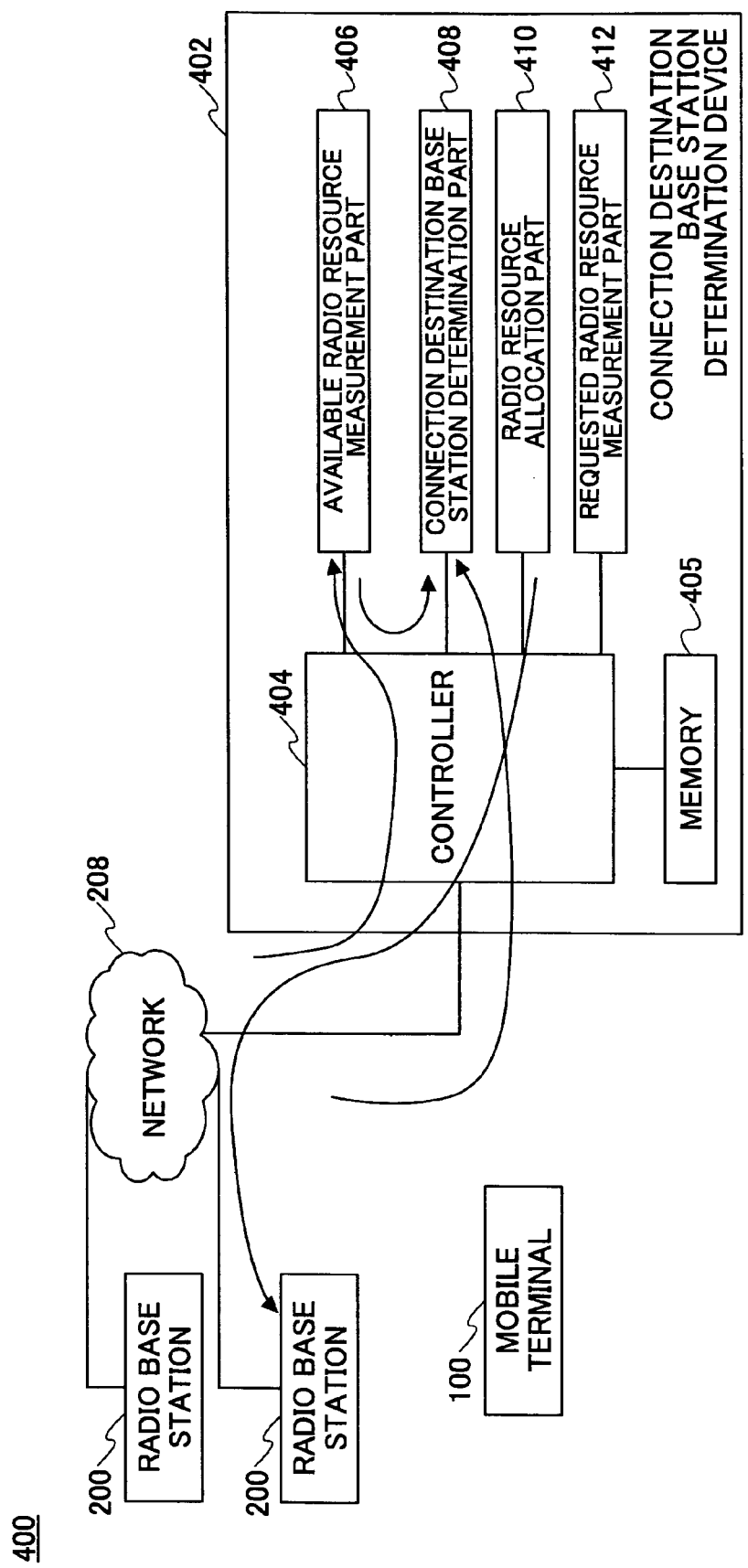
FIG. 3 is a functional block diagram related to principal functions of a connection destination base station determination device according to the embodiment of the present invention.

FIG. 3 shows a functional block diagram related to principal functions of a connection determination base station determination device according to the embodiment of the present invention. It is assumed that a connection destination base station determination device 402 is provided in a radio network controller (RNC) or a control station managing multiple radio base stations 200. However, there is no limitation to the RNC, and it may also be provided in any apparatus superordinate to the radio base stations 200.

The connection destination base station determination device 402 has a controller 404, and the controller 404 controls various processing elements in the connection destination base station determination device 402. The connection destination base station determination device 402 has an available radio resource measurement part 406, a connection destination base station determination part 408, a radio resource allocation part 410, and a requested radio resource measurement part 412, which are connected to the controller 404. The available radio resource measurement part 406 receives, from each radio base station 200, information on how much amount of available resources the radio base station 200 currently possesses, and stores it in a memory 405. The memory 405 stores information items necessary for connection destination determination. The connection destination base station determination part 408 determines an appropriate connection destination radio base station based on the amounts of available resources of the radio base stations 200 and the requested amount of resources obtained from the mobile terminal 100 (determined in the requested radio resource measurement part 412). The radio resource allocation part 410 gives an instruction to allocate communications resources so that the radio base station 200 determined as a connection destination in the connection destination base station determination part 408 establishes a radio link with the mobile terminal 100.

A description is given below of an operation related to determination of the connection destination base station according to the embodiment of the present invention. In general, the scenes of determining the connection destination base station of a mobile terminal include calling time and handover time in particular. In the case of calling time, there is further classification into two types: (a) a mobile terminal-led type with a mobile terminal determining the connection destination base station and (b) a control station-led type with a control station determining the connection destination base station. In the case of (a) mobile terminal-led-type calling, there is an advantage in that the mobile terminal obtains information necessary for calling and makes a determination so that only a small amount of radio resources for control is required. In the case of (b) control station-led-type calling, there is an advantage in that the control station has the entire function of determining the connection destination base station so that it is possible to reduce the processing load of a mobile terminal.

At the time of handover, three types are possible: (c) a mobile terminal-triggered, mobile terminal-led type with a mobile terminal determining the chance or trigger for handover and the mobile terminal also determining the connection determination base station, (d) a mobile terminal-triggered, control station-led type with a mobile terminal determining the chance for handover and a control station determining the connection destination base station, and (e) a control station-triggered, control station-led type with a control station determining the chance for handover and determining the connection destination base station. In the case of (c) mobile terminal-triggered, mobile terminal-led-type handover, there is an advantage in that since determination of handover and the connection destination base station is performed entirely in the mobile terminal, it is possible to make a quick response to a change in a radio transmission environment, thus reducing the probability of disconnection of an in-communication call. In the case of (d) mobile terminal-triggered, control station-led-type handover, there is an advantage in that since the control station determines the handover destination base station, it is possible to reduce the processing load of a mobile terminal. In the case of (e) control station-triggered, control station-led-type handover, there is an advantage in that since the control station determines the handover destination base station and determines the handover trigger, it is possible to reduce the processing load of a mobile terminal. In the case of the control station-led type, providing a base station with the function of a control station makes it possible to simplify the function of the control station.

In the case of the control station-led type, it is also possible to provide a base station with the function of a control station. In this case, however, it is necessary for the base stations to share available resource information. That is, it is necessary for the radio base stations to inform each other of information on the amounts of available resources, or to obtain information on the amount of available resources of each radio base station from an RNC.

A description is given below of an operation in each of the cases of (a) through (e).

(a) In the case of mobile terminal-led-type calling time

Figure 6:
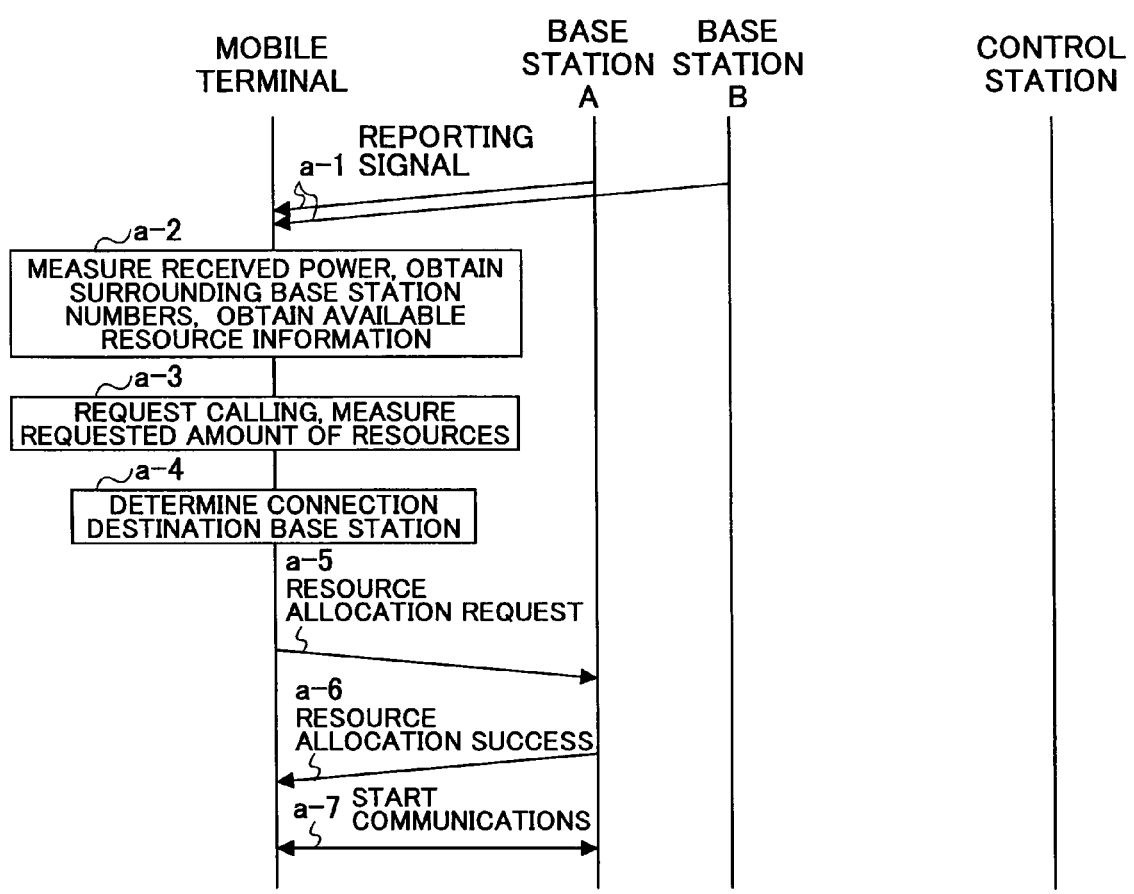
FIG. 6 is a flowchart showing an operation according to the embodiment of the present invention.

FIG. 6 shows an operation where the mobile terminal 100 of FIG. 1 originates a call and determines the connection destination base station so that the mobile terminal 100 establishes a connection with a radio base station.

As shown in step a-1, base stations periodically transmit reporting signals.

In step a-2, when the mobile terminal receives a reporting signal, the mobile terminal measures the power received from the base station. Further, the mobile terminal obtains information indicating the base station and available resource information from the reporting information, and retains the information in, for example, the memory 113 (FIG. 1) in the mobile terminal. In this case, the available radio resource measurement request part 118 is not necessary. The available radio resource information can be obtained by making a query from the mobile terminal using the available radio resource measurement request part 118, measuring available radio resources in the base station (the available radio resource measurement part 214 of FIG. 2) or a control station (the available radio resource measurement part 406 of FIG. 3), and notifying the mobile terminal of them. This is advantageous in that the amount of information of the reporting signal is reduced so that it is possible to reduce the amount of radio resources.

In step a-3, when the mobile terminal originates a call, first, the requested radio resource measurement part 114 measures the requested amount of resources, and notifies the connection destination base station determination part 116 of it.

In step a-4, the connection destination base station determination part 116 determines the connection destination base station based on the received power and the amount of available resources. The connection destination base station can be determined in accordance with, for example, the flowchart shown in FIG. 4. That is, in step S1, of the base stations surrounding the mobile terminal, the base stations of received power greater than or equal to a prescribed value are selected. Here, the information indicating the base station having transmitted the signal received with power at or above the certain level in the mobile terminal may be transmitted from the control station. In step S2, from among those, the base stations having the amount of available resources exceeding the requested amount of resources are selected. Further, in step S3, from among those, the base station of the smallest amount of available resources is determined as the connection destination base station.

In step a-5, if the connection destination base station is a base station A, a resource allocation request is transmitted to the determined base station A using a radio resource allocation part 120.

In step a-6, if the resource allocation succeeds in the base station A, a resource allocation success notice is transmitted to the mobile terminal.

In step a-7, after the synchronization of the base station A and the mobile terminal is ensured, desired communications are started.

By the way, if the resource allocation in step a-5 fails, it is necessary to reset the connection destination base station. Therefore, as shown in step S4 of FIG. 5, it is advantageous to enumerate (list) candidate base stations in ascending order of the amount of resources in determining the connection destination base station. For example, a list of candidate connection destination base stations is created in the connection destination base station determination part 116, and the list is stored in the memory 113. The connection destination base station selected in step a-5 is the first candidate base station. In FIG. 5, steps S1 and S2 are the same as steps S1 and S2 of FIG. 4, and accordingly, a description thereof is omitted.

Figure 7:
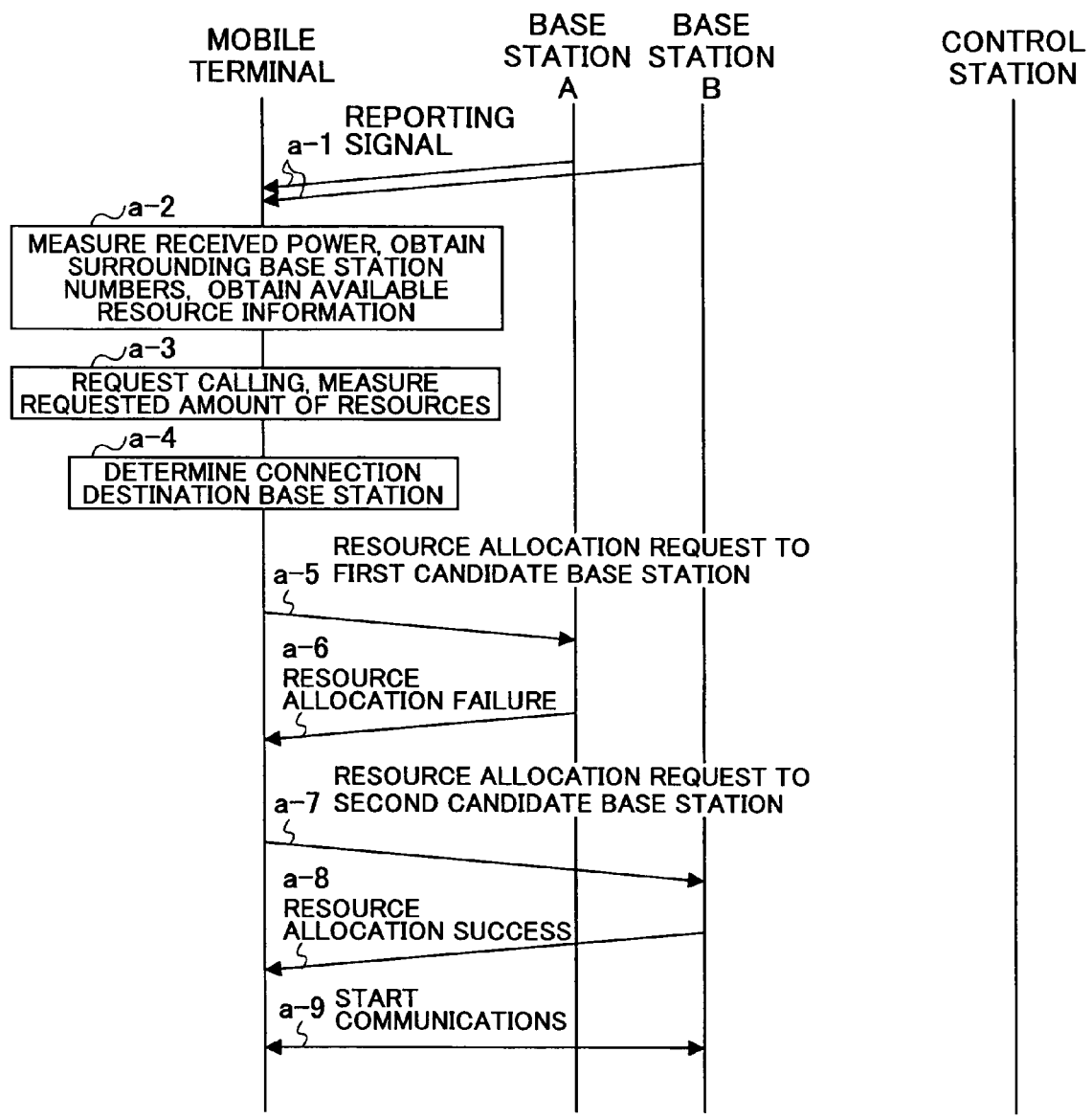
FIG. 7 is a flowchart showing an operation according to the embodiment of the present invention.

A description is given, with reference to FIG. 7, of a procedure in the case of failure in the resource allocation in step a-5 of FIG. 6. In the drawing, the operation of steps a-1 through a-5 is the same as that in FIG. 6, and accordingly, a description thereof is omitted.

In step a-6, the resource allocation fails in such a case where the available resources of the base station A are less than the amount of resources at the time of obtaining the available resource information. Then, the base station A transmits a resource allocation failure message to the mobile terminal.

In step a-7, receiving the resource allocation failure message, the mobile terminal sets a base station B, which is the second candidate for connection, as the connection destination base station, and the mobile terminal transmits a resource allocation request message to the base station B. If resource allocation succeeds (a-8), communications are started with the same procedure as described above (a-9). If the resource allocation fails again, a connection to the third candidate base station is attempted. If the connection destination base station has not been found from among the reported connection destination candidate base stations, it is also possible to notify the mobile terminal of connection failure and cause the mobile terminal to reperform the connection destination base station determination.

(b) In the case of control station-led-type calling time

Figure 8:
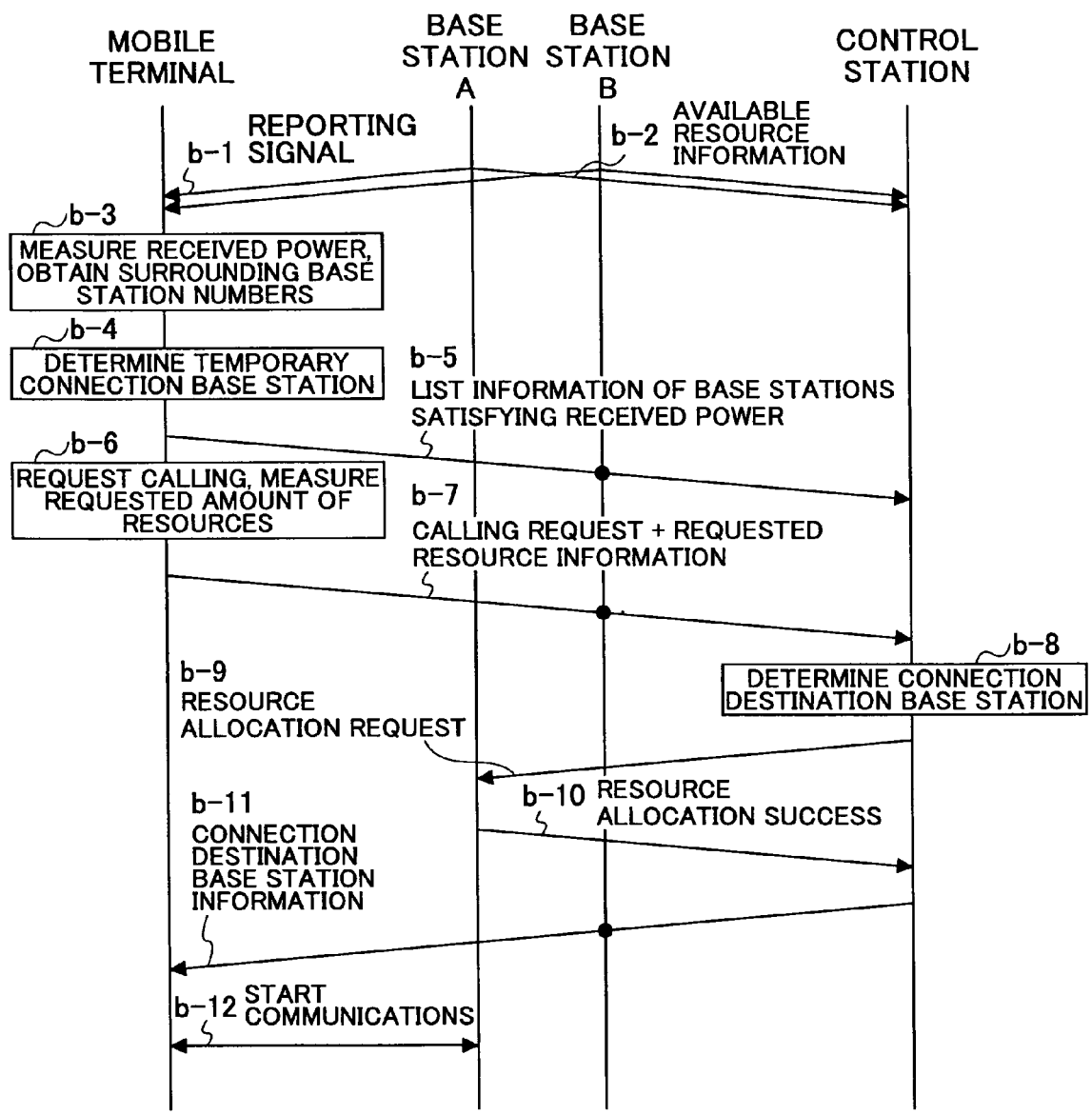
FIG. 8 is a flowchart showing an operation according to the embodiment of the present invention.

FIG. 8 shows the operation of getting connected to a base station in the case where the mobile terminal 100 of FIG. 1 originates a call and a control station determines the connection destination base station.

As shown in step b-1, base stations periodically transmit reporting signals to the mobile terminal.

As shown in step b-2, each base station notifies a superordinate control station of its available resource information.

In step b-3, receiving a reporting signal, the mobile terminal measures the power received from the base station.

In step b-4, the mobile terminal determines, from the reporting information, from which base station the reception is, and determines (the base station B as) the temporary connection base station for transmitting a calling request. Such a base station can be determined as, for example, the base station providing the highest received power.

In step b-5, the mobile terminal communicates to the control station, through the base station B, a list of the base stations satisfying prescribed received power of the base stations whose reporting information has been received.

In step b-6, when the mobile terminal attempts to originate a call, first, the requested amount of resources is measured in the requested radio resource measurement part 114, and is stored in, for example, the memory 113.

In step b-7, the control station is notified of a calling request and the requested amount of resources through the temporary connection base station.

Figure 4:
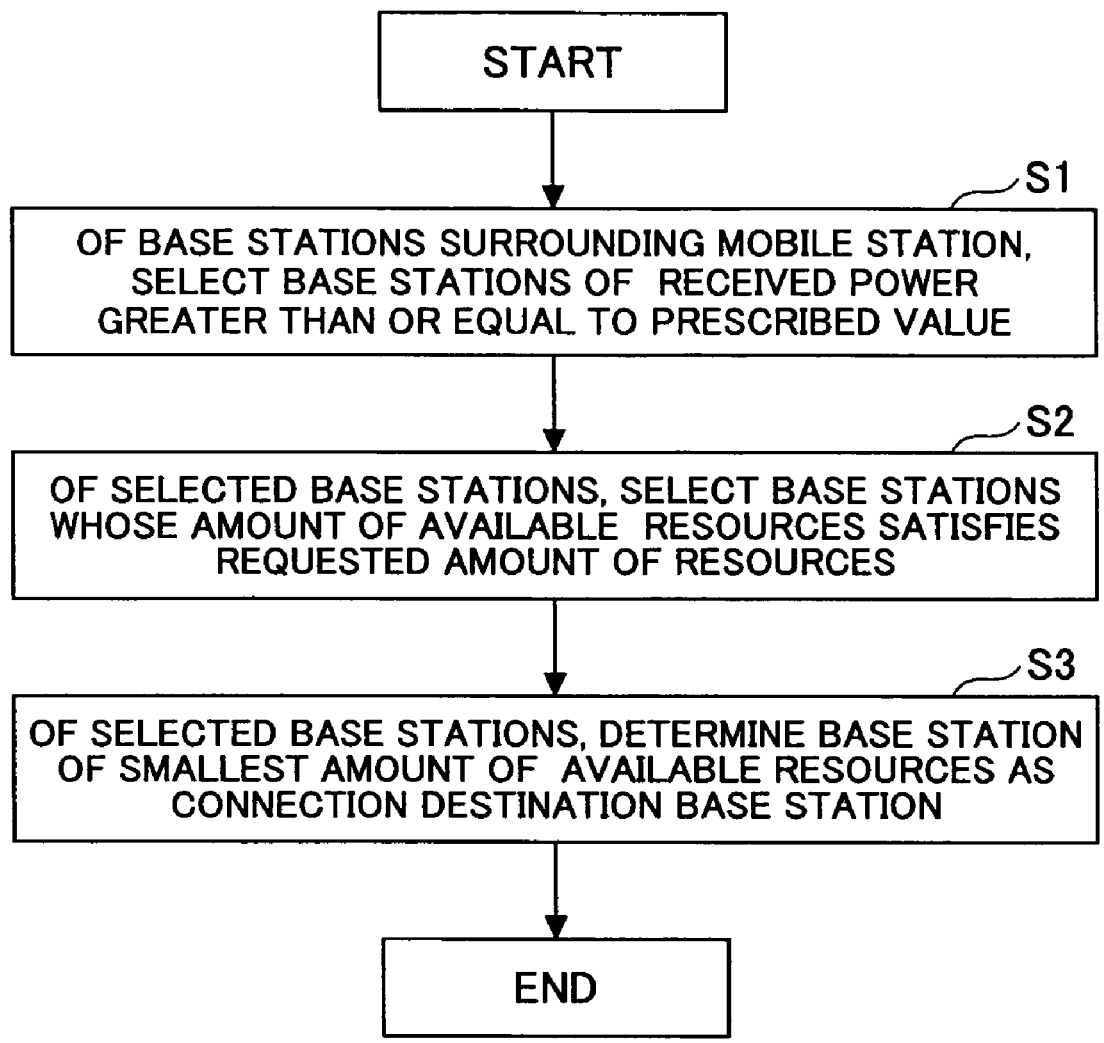
FIG. 4 is a flowchart showing an operational procedure for determining a connection destination base station according to the embodiment of the present invention.
Figure 5:
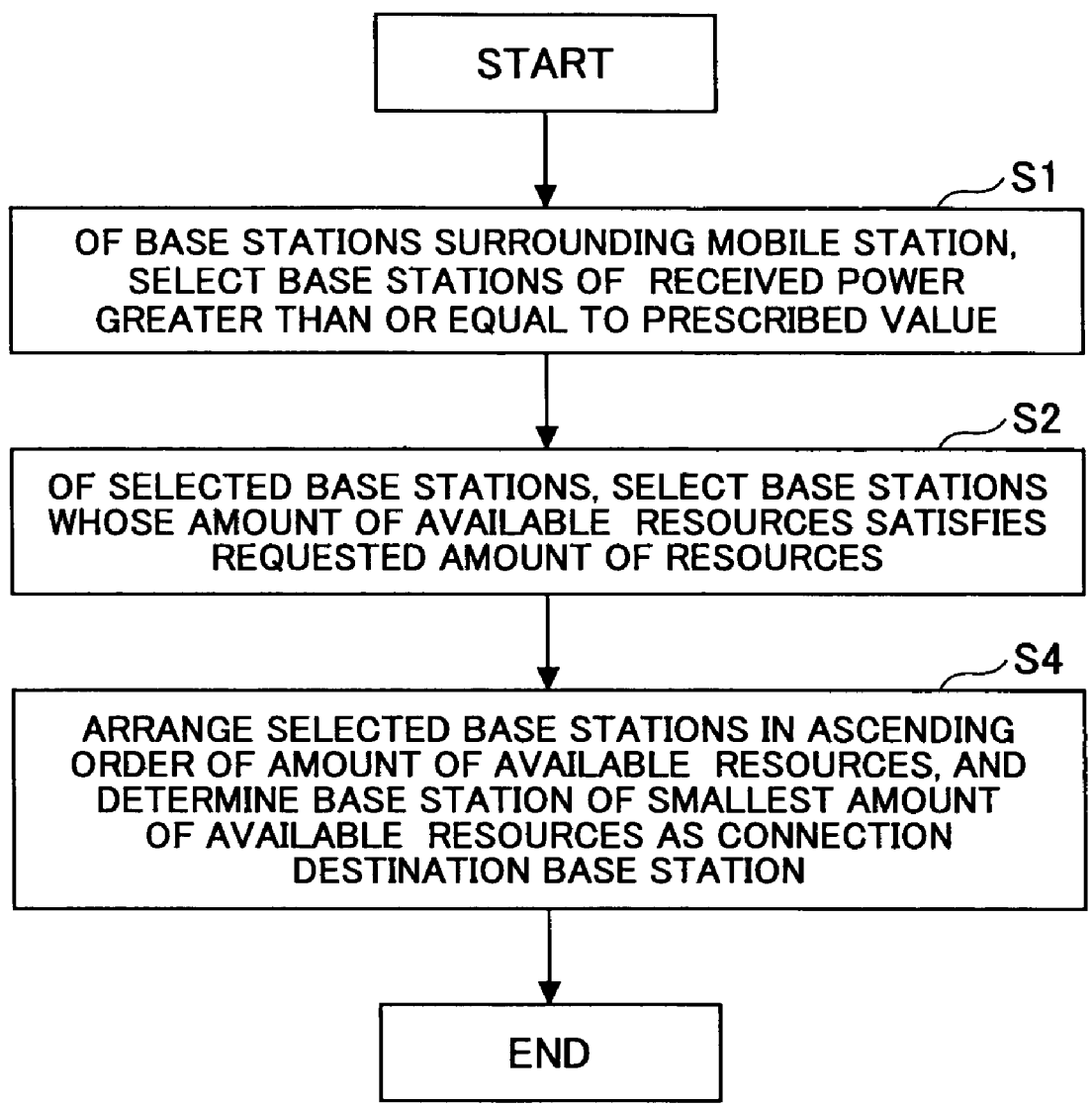
FIG. 5 is a flowchart showing an operational procedure for determining the connection destination base station according to the embodiment of the present invention.

As shown in step b-8, receiving the calling request from the mobile terminal, the control station performs the connection destination base station determination operation shown in FIG. 4 in the connection destination base station determination part 408 of FIG. 3. First, of the surrounding base stations, the base stations of received power greater than or equal to the prescribed value are selected. From among those, the base stations having the amount of resources exceeding the requested amount of resources are selected. Further, from among those, the base station having the smallest amount of available resources is determined as the connection destination base station. Here, it is assumed that the base station A is selected.

When the base station A is determined as the connection destination base station, in step b-9, the control station instructs the base station A to allocate the resources requested by the mobile terminal, using the radio resource allocation part 410.

In step b-10, when the resource allocation succeeds in the base station A, the base station A returns a response to the control station.

In step b-11, receiving the resource allocation success message from the base station A, the control station transmits connection destination base station information to the mobile terminal.

In step b-12, receiving the connection destination base station information, the mobile terminal starts communications after ensuring the synchronization with the base station A.

By the way, if the resource allocation in step b-9 fails, it is necessary to reset the connection destination base station. In this case, as shown in FIG. 5, it is advantageous to arrange candidates in ascending order in determining the connection destination base station. For example, it is possible to create a list of connection destination candidate base stations in the connection destination base station determination part 408 and store it in the memory 405. In this case, the connection destination base station in step b-9 is the first candidate base station.

Figure 9:
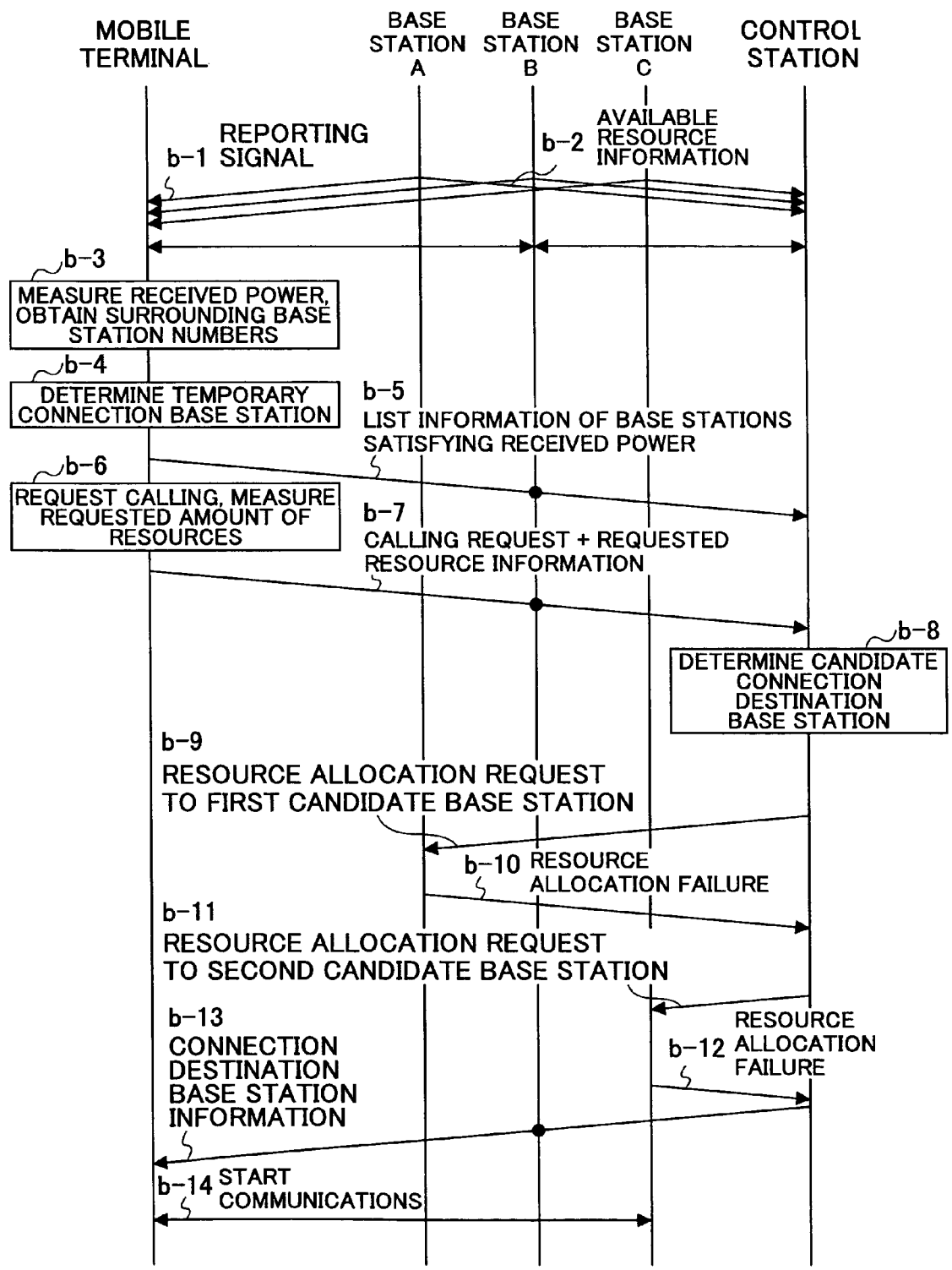
FIG. 9 is a flowchart showing an operation according to the embodiment of the present invention.

FIG. 9 is an operation in such a case of failure in resource allocation. In general, the operation of steps b-1 through b-9 is the same as that in FIG. 8, and accordingly, a description thereof is omitted. If resource allocation fails in a base station, it is necessary to reset the connection destination base station.

In step b-10, the resource allocation fails in such a case where the available resources of the base station A have changed from the value at the time of obtaining the available resource information so as to be less than the requested amount of resources. At this point, the base station A transmits a resource allocation failure message to the control station.

In step b-11, receiving the resource allocation failure message, the control station sets a base station C, which is the second in order, as the connection destination base station, and transmits a resource allocation request to the base station C. The subsequent flow is the same as the steps after above-described step b-9. If the connection destination base station has not been found from among the reported connection destination candidate base stations, it is also advantageous to notify the mobile terminal of connection failure and cause the mobile terminal to reperform the connection destination base station determination.

(c) In the case of mobile terminal-triggered, mobile terminal-led-type handover

Figure 10:
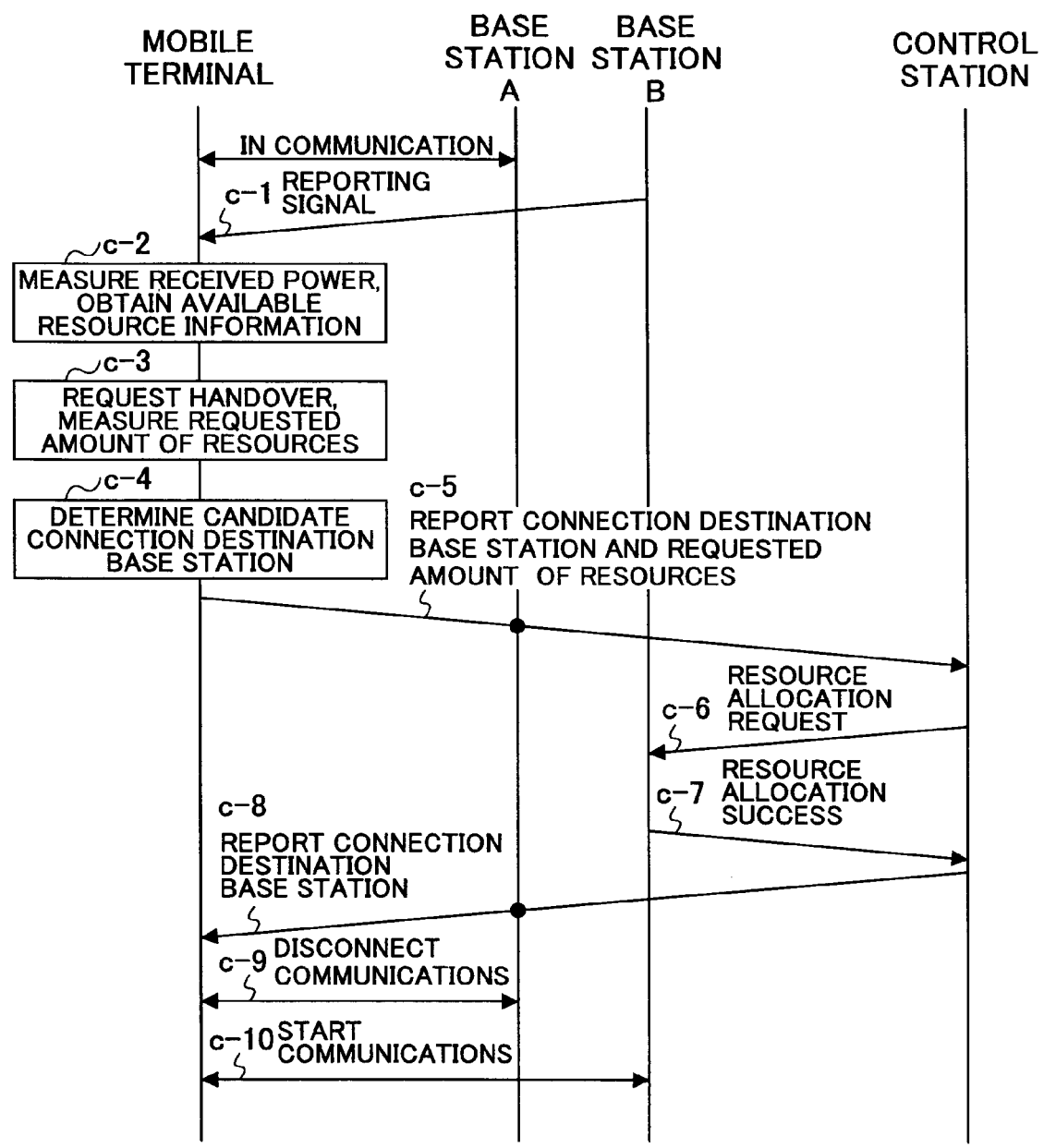
FIG. 10 is a flowchart showing an operation according to the embodiment of the present invention.

FIG. 10 shows an operation in the case where the mobile terminal 100 of FIG. 1 requests handover and determines the candidate handover destination base station. For convenience of description, it is assumed that the mobile terminal is communicating with the base station A.

In step c-1, each base station periodically transmits a reporting signal.

In step c-2, the mobile terminal measures the received power of the reporting signals from the surrounding base stations. The mobile terminal can read the available radio resource information measured in the available radio resource measurement part 214 of FIG. 2 from among the reporting information from each base station. Alternatively, the mobile station can obtain the resource information of the surrounding base stations by being informed of the available resource information measured in the available radio resource measurement part 406 of FIG. 3 through the base station with which the mobile terminal is communicating. Further, instead of the mobile terminal being periodically informed of the available resource information, the control station may respond to the request of the mobile terminal. This method has the advantage of saving radio resources if the frequency of response is low.

In step c-3, the mobile terminal determines to make a request for handover in such a case where the received power from the base station A with which it is communicating is below a prescribed value. The amount of resources required by the in-communication call is measured. This can be performed in the requested radio resource measurement part 114.

In step c-4, the mobile terminal, which has determined to make a request for handover, starts a procedure for determining the handover destination base station (FIG. 4) in the connection destination base station determination part 116. That is, of the surrounding base stations, the base stations of received power greater than or equal to a prescribed value are selected, and are reduced to the base stations having the amount of available resources exceeding the requested amount of resources. Further, from among those, the base station having the smallest amount of available resources is determined as the handover destination base station.

When the handover destination base station is determined, in step c-5, the mobile terminal notifies the control station of information indicating the handover destination base station and the requested amount of resources of the mobile terminal.

In step c-6, the control station instructs the base station B of which it has been notified to allocate the resources requested by the mobile terminal, using the radio resource allocation part 410.

In step c-7, if succeeding in resource allocation, the base station B returns a resource allocation success message to the control station.

In step c-8, receiving the resource allocation success message, the control station notifies the mobile terminal of the handover destination base station.

In step c-9, the mobile terminal disconnects the communications with the base station A.

In step c-10, the mobile terminal and the base station B start communicating after ensuring synchronization.

By the way, if the resource allocation fails in step c-6, it is necessary to reset the handover destination base station. In this case, it is advantageous to enumerate candidates in ascending order of the amount of resources in determining the connection destination base station as shown in FIG. 5. For example, a list of connection destination candidate base stations is created in the connection destination base station determination part 408, and is stored in the memory 405. In this case, the connection destination base station of step c-6 is the first candidate base station.

Figure 11:
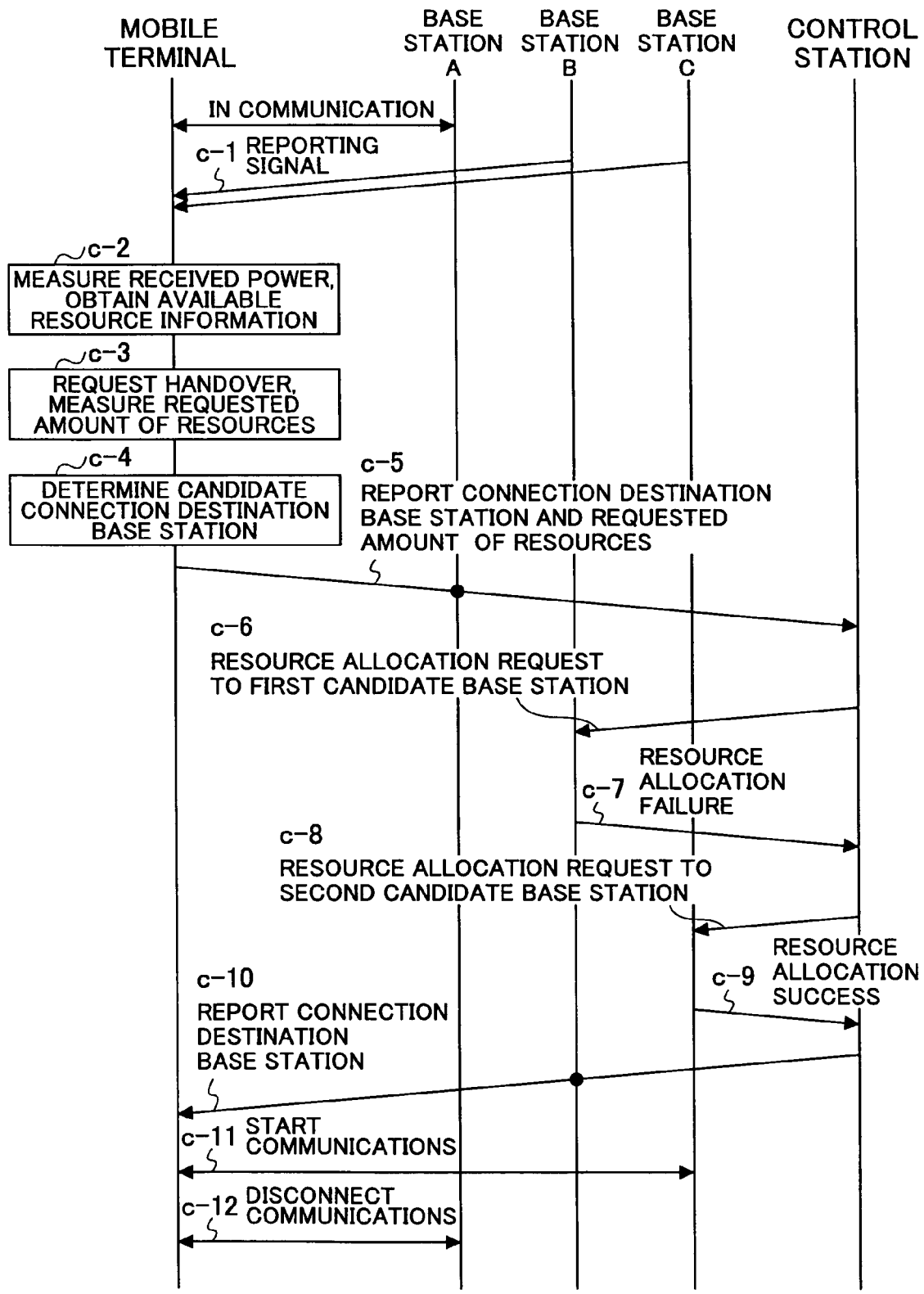
FIG. 11 is a flowchart showing an operation according to the embodiment of the present invention.

FIG. 11 shows an operation in the case of failure in resource allocation. In general, the procedure of step c-1 through step c-6 is the same as that described in FIG. 10, and accordingly, a description thereof is omitted.

In step c-7, if failing in resource allocation, the base station B returns a resource allocation failure message to the control station.

In step c-8, when the resource allocation failure message is returned, the control station determines the base station C, which is the second candidate handover destination, as the handover destination base station, and repeats the procedure beginning with above-described step c-6. If the handover destination base station has not been found from among the reported handover destination candidate base stations, it is also advantageous to notify the mobile terminal of handover failure and cause the mobile terminal to reperform the handover destination base station determination.

(d) In the case of mobile terminal-triggered, control station-led-type handover

Figure 12:
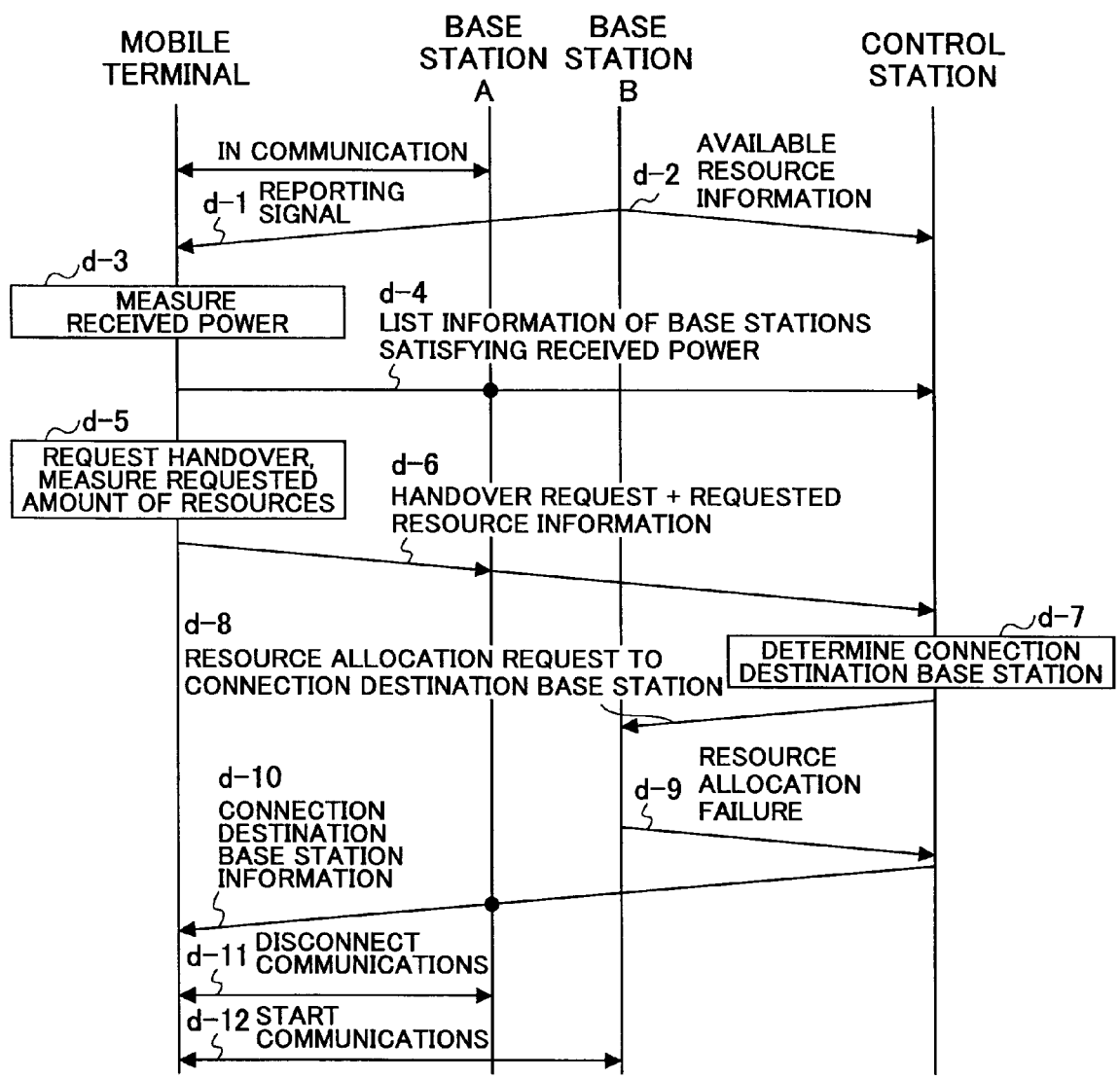
FIG. 12 is a flowchart showing an operation according to the embodiment of the present invention.

FIG. 12 shows an operation in the case where the mobile terminal requests handover and the control station of FIG. 3 determines the candidate handover destination base station. For convenience of description, it is assumed that the mobile terminal is communicating with the base station A.

As shown in step d-1, each base station periodically transmits a reporting signal.

As shown in step d-2, each base station notifies the control station of its available resource information. Alternatively, it is also possible that the control station queries each base station through the available radio resource measurement part 406 and collects the available radio resource information. In the latter case, if the frequency is low, there is an advantage in that information flowing through the network is reduced in amount so that it is possible to reduce network traffic.

In step d-3, the mobile terminal measures the received power of the reporting signals from the surrounding base stations.

In step d-4, the mobile terminal communicates to the control station a list of base stations of received power satisfying a prescribed value.

In step d-5, the mobile terminal determines to make a request for handover in such a case where the received power from the base station A with which it is communicating is below a prescribed value. The amount of resources required by the communicating call is measured in the requested radio resource measurement part 114.

In step d-6, the mobile terminal, which has determined to make a request for handover, notifies the control station of the requested amount of resources together with a handover request.

In step d-7, receiving the handover request, the control station starts the procedure for determining the handover destination base station as shown in FIG. 4 in the connection destination base station determination part 408. However, it should be noted that it has already been notified which base stations satisfy the prescribed received power. From among the base stations satisfying the prescribed received power, the control station selects base stations whose amount of available resources exceeds the requested amount of resources. Further, from among those, the control station determines the base station having the smallest amount of available resources as the handover destination base station.

In step d-8, the control station instructs the base station B determined as the handover destination to allocate the resources requested by the mobile terminal in the radio resource allocation part 410.

In step d-9, if succeeding in resource allocation, the base station B returns a resource allocation success message to the control station.

In step d-10, receiving the resource allocation success message, the control station notifies the mobile station of the connection destination base station.

In step d-11, the mobile terminal disconnects the communications with the base station A.

In step d-12, the mobile terminal and the base station B start communicating after ensuring synchronization.

By the way, if the resource allocation in step d-8 fails, it is necessary to reset the handover destination base station. In this case, it is advantageous to enumerate candidate connection destination base stations in ascending order of the amount of resources in determining the connection destination base station as shown in FIG. 5. For example, a list of connection destination candidate base stations can be created in the connection destination base station determination part 408, and can be stored in the memory 405. In this case, the connection destination base station of step d-8 is the first candidate base station.

Figure 13:
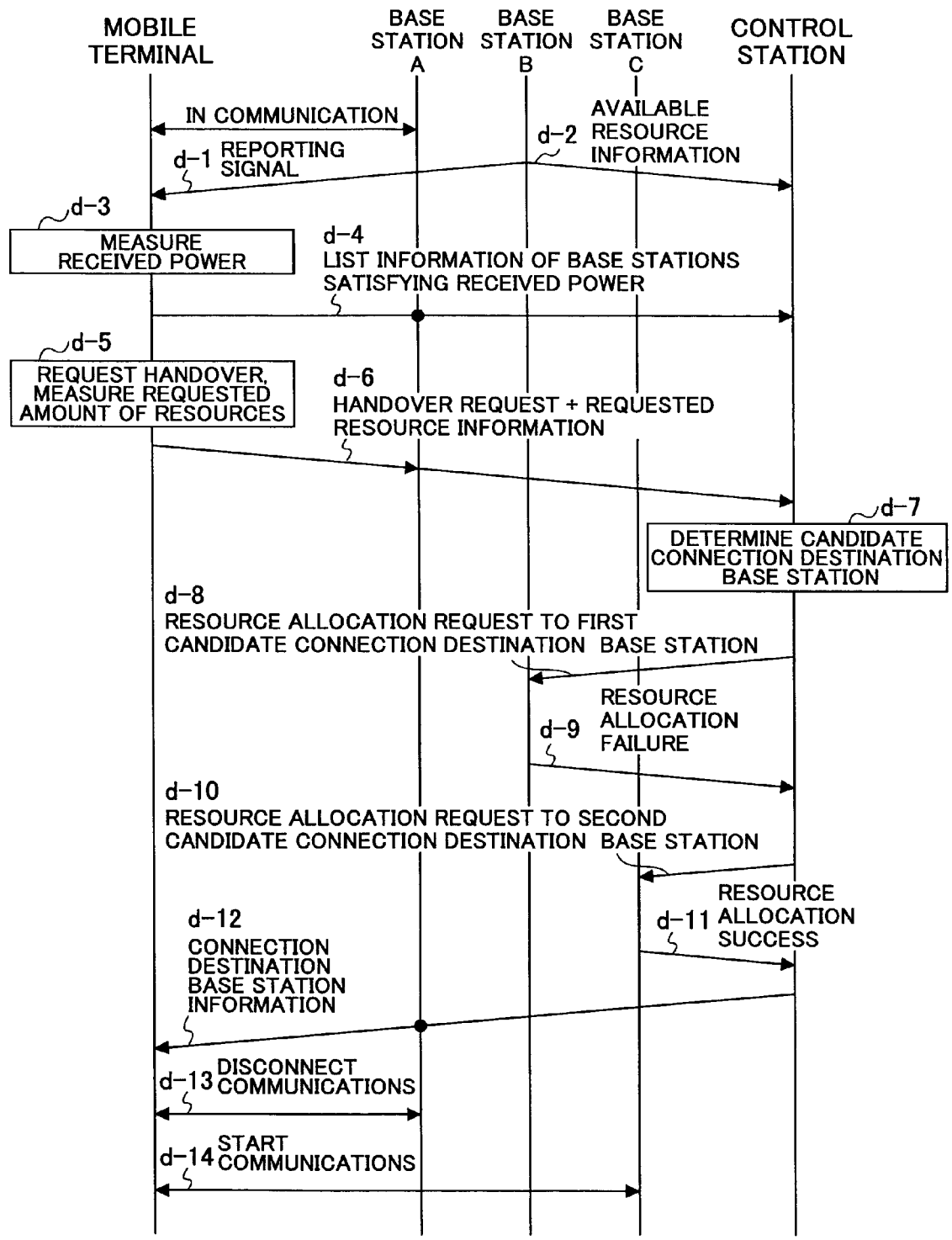
FIG. 13 is a flowchart showing an operation according to the embodiment of the present invention.

FIG. 13 shows an operation in the case of failure in the resource allocation in step d-8. The operation of steps d-1 through d-8 is the same as that shown in FIG. 12, and accordingly, a description thereof is omitted.

In step d-9, if failing in resource allocation, the base station B returns a resource allocation failure message to the control station.

As shown in step d-10, receiving the resource allocation failure message, the control station determines the base station C, which is the second candidate handover destination, as the handover destination base station, and repeats the sequence beginning with above-described step d-8. Here, if the handover destination base station has not been found from among the reported handover destination candidate base stations, it is also advantageous to notify the mobile terminal of handover failure and cause the mobile terminal to reperform the handover destination base station determination.

(e) In the case of control station-triggered, control station-led-type handover

Figure 14:
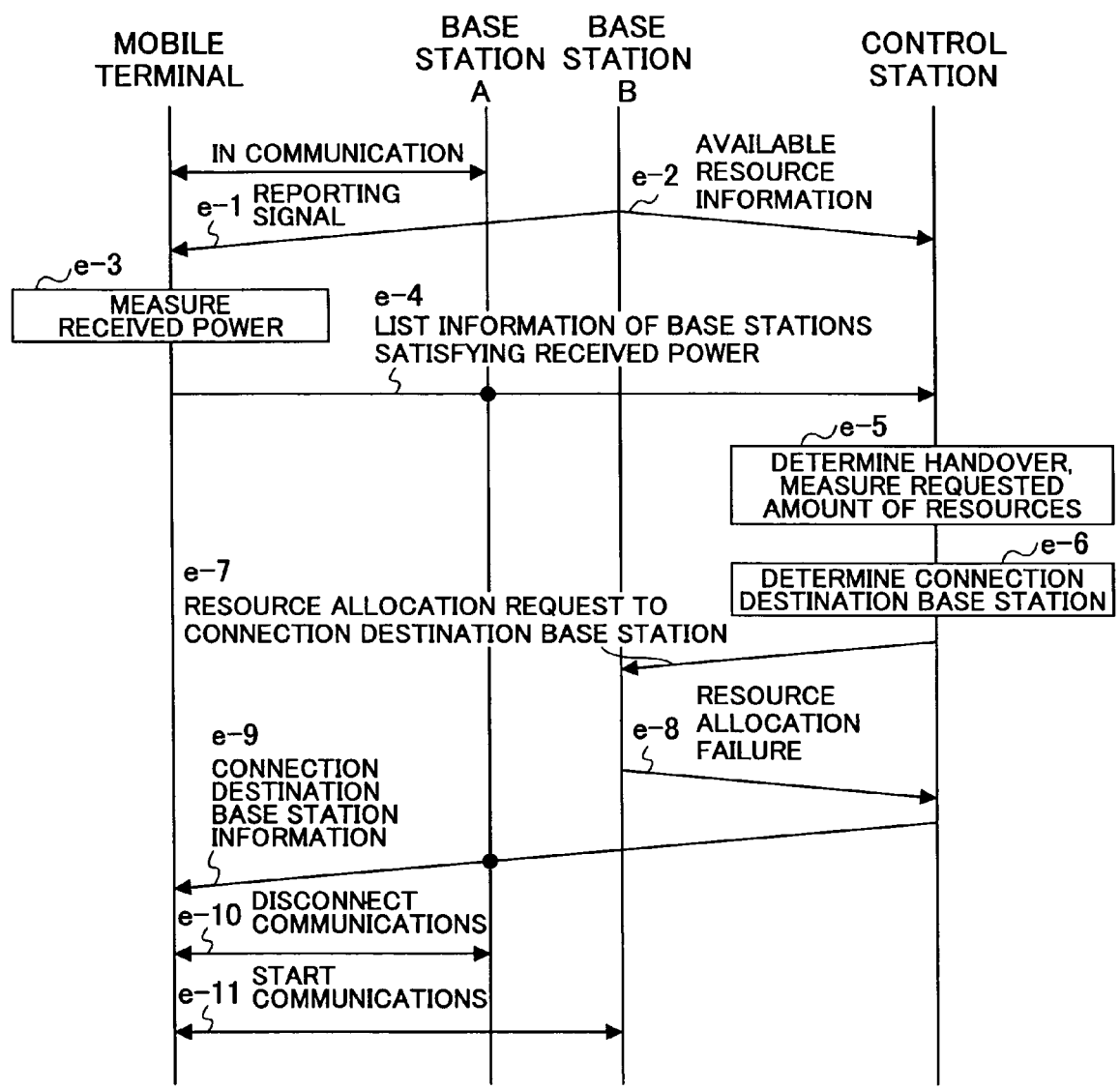
FIG. 14 is a flowchart showing an operation according to the embodiment of the present invention.

FIG. 14 shows an operation in the case where the control station of FIG. 1 determines and requests the handover of the mobile station, and determines the candidate handover destination base station. For convenience of description, the mobile station is communicating with the base station A.

As shown in step e-1, each base station periodically transmits a reporting signal.

As shown in step e-2, each base station notifies the control station of its available resource information. Alternatively, it is also possible that the control station queries each base station through the available radio resource measurement part 406 and collects the available resource information. The latter method is advantageous in that if the frequency is low, information flowing through the network is reduced in amount so that it is possible to reduce network traffic.

In step e-3, the mobile terminal measures the received power of the reporting signals from the surrounding base stations.

In step e-4, the mobile terminal communicates to the control station a list of base stations having received power satisfying a prescribed value.

In step e-5, the control station determines the trigger for the mobile terminal to perform handover by some method. This determination can be performed, for example, by being informed of the received power list in step e-4 and comparing the received power of the base station A in communication with a handover threshold. If it is determined that it is better to perform handover, the requested amount of resources is measured. This is performed in the requested radio resource measurement part 412. For example, it is possible to estimate the required amount of radio resources from, for example, the transmission speed of the mobile terminal.

In step e-6, having determined that the mobile terminal should perform handover and having finished estimating the requested amount of resources, the control station starts the handover destination base station determination procedure (FIG. 4) in the connection destination base station determination part 408. However, it should be noted that the base stations satisfying the prescribed received power have already been reported. From among the base stations satisfying the prescribed received power, the control station selects base stations whose amount of available resources exceeds the requested amount of resources. Further, from among those, the control station determines the base station having the smallest amount of available resources as the handover destination base station.

In step e-7, the control station instructs the determined base station B to allocate the requested resources to the mobile terminal in the radio resource allocation part 410.

In step e-8, if succeeding in resource allocation, the base station B returns a resource allocation success message to the control station.

In step e-9, receiving the resource allocation success message, the control station communicates the connection destination base station information to the mobile station.

In step e-10, the mobile terminal disconnects the communications with the base station A.

In step e-11, the mobile terminal and the base station B start communicating when the synchronization is established.

By the way, if the resource allocation fails in step e-7, it is necessary to reset the handover destination base station. In this case, it is advantageous to list candidates in determining the connection destination base station as shown in FIG. 5. For example, a list of connection destination candidate base stations can be created in the connection destination base station determination part 408, and can be stored in the memory 405. At this point, the connection destination base station of step e-7 is the first candidate base station.

Figure 15:
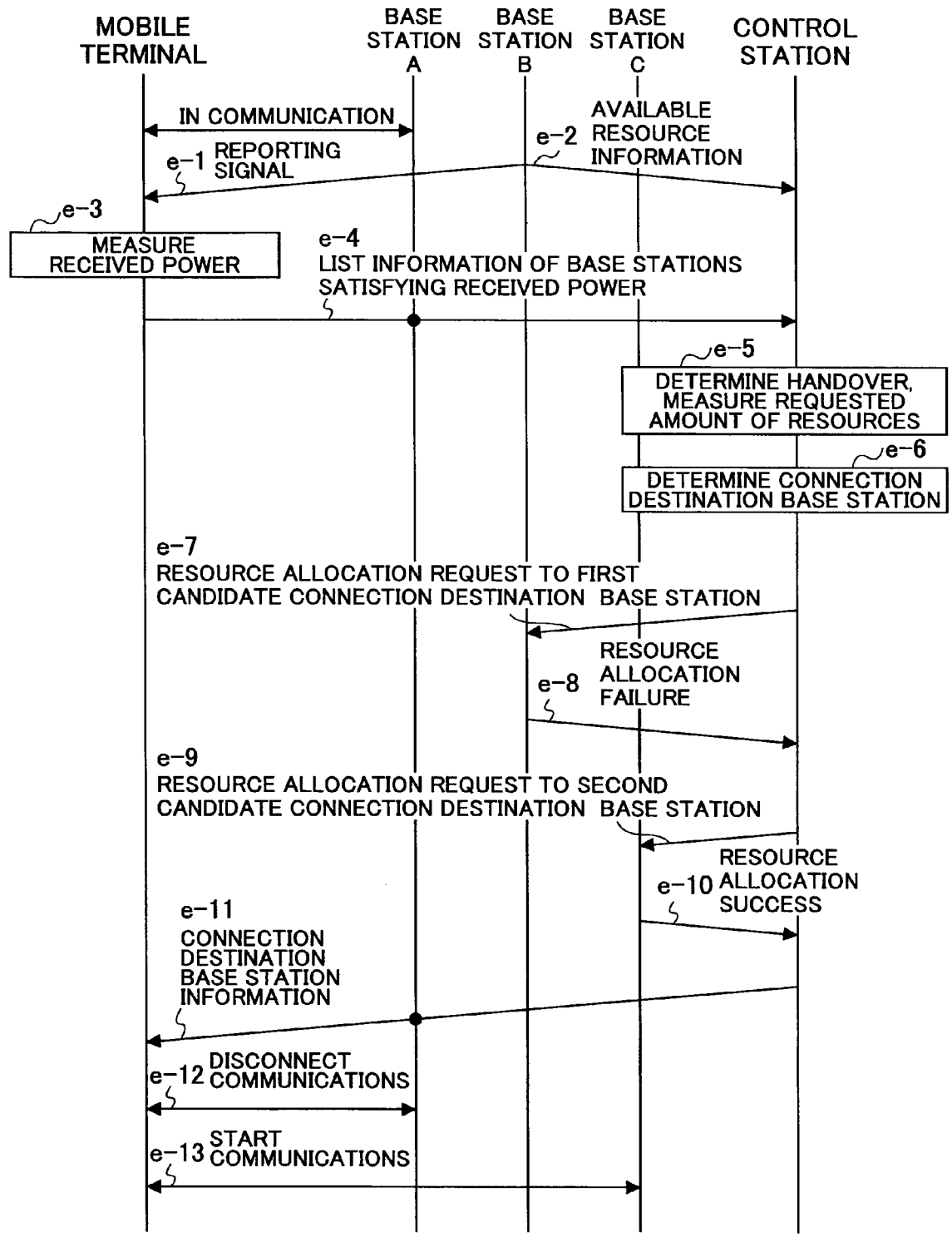
FIG. 15 is a flowchart showing an operation according to the embodiment of the present invention.

FIG. 15 shows an operation in the case of failure in the resource allocation in step e-7. The operation of steps e-1 through e-7 is the same as that shown in FIG. 14, and accordingly, a description thereof is omitted.

In step e-8, if failing in resource allocation, the base station B returns a resource allocation failure message to the control station.

In step e-9, receiving the resource allocation failure message, the control station determines the base station C, which is the second candidate handover destination, as the handover destination base station, so that the sequence beginning with above-described step e-7 is repeated. If the handover destination base station has not been found from among the reported connection destination candidate base stations, it is also advantageous to notify the mobile terminal of connection failure and cause the mobile terminal to reperform the handover destination base station determination.

Thus, according to the embodiment of the present invention, of the radio base stations that can be connection destinations in terms of received power and the amount of available radio resources, the radio base station having the smallest amount of available radio resources is determined as the connection destination. Determining a new or handover-related connection destination in this manner causes radio base stations having a small amount of available radio resources and radio base stations having a large amount of available radio resources to exist within a service area. A mobile terminal requesting only a small amount of radio resources determines the former radio base station as the connection destination. A mobile terminal requesting a large amount of radio resources determines the latter radio base station as the connection destination. That is, according to the embodiment of the present invention, it is possible to prepare for communications requesting a large amount of radio resources by making the usage rates of radio resources of the radio base stations uneven. Therefore, the rate of new connections of a mobile terminal performing high-speed data transmission is better than conventionally. Further, in order to make the usage rates of radio resources of radio base stations uneven, it is not necessarily required to select a radio base station having the smallest amount of available radio resources as a connection destination. More generally, it is possible to select a radio base station different from a radio station having the largest amount of available radio resources as a connection destination radio base station. However, in terms of preparing for communications requiring a large amount of radio resources by maximizing the unevenness of the usage rates of radio resources of radio base stations, it is desirable to select the radio base station having the smallest amount of available radio resources as a connection destination.

The present invention is not limited to the specifically disclosed embodiment, and variations and modifications may be made without departing from the scope of the present invention.

What is claimed is:

1. A connection destination base station determination device, comprising:
   a storage part configured to store information indicating a radio base station having transmitted a signal received with power at or above a certain level in a mobile terminal, and information indicating an amount of resources in the radio base station that are available to be allocated;
   a selection part configured to select radio base stations having an amount of resources available to be allocated greater than or equal to an amount of resources requested by the mobile terminal, to arrange the selected radio base stations in ascending order of the amount of resources available to be allocated, and to determine a radio base station having a smallest amount of resources available to be allocated as a connection destination radio base station among the selected radio base stations based on the arrangement of the selected radio base stations; and
   a notification part configured to notify the selected radio base station that the mobile terminal is to be connected thereto,
   wherein the information indicating the radio base station having transmitted the signal received with the power at or above the certain level in the mobile terminal, and the information indicating the amount of resources in the radio base station that are available to be allocated are transmitted from a base station management device superordinate to the radio base station.

2. The connection destination base station determination device as claimed in claim 1, wherein the connection destination base station determination device is provided in the mobile terminal.

3. The connection destination base station determination device as claimed in claim 2, further comprising:
   a reception part configured to receive the information indicating the amount of resources in the radio base station that are available to be allocated from the radio base station.

4. The connection destination base station determination device as claimed in claim 2, further comprising:
   a request part configured to transmit to the radio base station a signal to request the amount of resources in the radio base station that are available to be allocated.

5. The connection destination base station determination device as claimed in claim 1, wherein the connection destination base station determination device is provided in a radio network controller managing the radio base stations.

6. The connection destination base station determination device as claimed in claim 5, further comprising:
   a reception part configured to receive the information indicating the amount of resources in the radio base station that are available to be allocated from each of the radio base stations.

7. The connection destination base station determination device as claimed in claim 1, wherein the connection destination base station determination device is provided in the radio base station.

8. The connection destination base station determination device as claimed in claim 7, further comprising:
   a communications part configured to communicate information on resources in the radio base station that are available to be allocated with each of the radio base stations.

* * * * *